United States Patent
Levy

(10) Patent No.: US 6,963,884 B1
(45) Date of Patent: Nov. 8, 2005

(54) RECOVERABLE DIGITAL CONTENT DEGRADATION: METHOD AND APPARATUS

(75) Inventor: Kenneth L. Levy, Stevenson, WA (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 09/522,678

(22) Filed: Mar. 10, 2000

Related U.S. Application Data

(60) Provisional application No. 60/123,581, filed on Mar. 10, 1999.

(51) Int. Cl.$^7$ .............................................. G06F 12/00
(52) U.S. Cl. ........................ 707/202; 707/203; 707/204
(58) Field of Search ........................... 705/1; 379/93.31, 379/93, 399.01; 395/182.03; 707/202, 200, 203; 380/19, 15, 203, 37; 360/137; 369/47; 364/569; 331/1 A; 382/232, 115

(56) References Cited

U.S. PATENT DOCUMENTS

| | | | |
|---|---|---|---|
| 5,010,405 A | | 4/1991 | Schreiber et al. |
| 5,161,191 A | * | 11/1992 | Gupta et al. ................... 380/37 |
| 5,375,110 A | * | 12/1994 | Nakane ........................ 369/47 |
| 5,463,351 A | * | 10/1995 | Marko et al. ................ 331/1 A |
| 5,515,451 A | | 5/1996 | Tsuji et al. |
| 5,530,759 A | | 6/1996 | Braudaway et al. |
| 5,553,142 A | * | 9/1996 | Tait ............................. 380/19 |
| 5,612,845 A | * | 3/1997 | Smith .......................... 360/137 |
| 5,617,339 A | * | 4/1997 | Smith .......................... 364/569 |
| 5,627,885 A | * | 5/1997 | Paneth et al. .................. 379/93 |
| 5,630,044 A | * | 5/1997 | Suzuki ................... 395/182.03 |
| 5,636,292 A | | 6/1997 | Rhoads |
| 5,644,637 A | * | 7/1997 | Landgraf ..................... 380/15 |
| 5,646,997 A | | 7/1997 | Barton |
| 5,719,937 A | | 2/1998 | Warren et al. |
| 5,721,788 A | | 2/1998 | Powell et al. |

(Continued)

FOREIGN PATENT DOCUMENTS

| | | |
|---|---|---|
| GB | 2346110 | 8/2000 |
| WO | WO 02/03385 | 1/2002 |
| WO | WO02/03385 | 1/2002 |
| WO | WO02/39719 | 5/2002 |

OTHER PUBLICATIONS

U.S. Appl. No. 60/123,581, filed Mar. 10, 1999, Levy.
Boucqueau et al., Equitable Conditional Access and Copyright Protection for Image Based on Trusted Third Parties, *Teleservices & Multimedia Communications, 2nd Int. Cost 237 Workshop*, Second International COST 237 Workshop, Nov., 1995; published 1996, pp. 229-243.
U.S. Appl. No. 09/480,391, filed Jan. 11, 2000, Tewfik.
"Windows XP Can Secure Music," by Brad King in Wired News, Feb. 13, 2001 (3 pages).
Mintzer et al., "Safeguarding Digital Library Contents and Users," D-Lib Magazine, Dec. 1997, 12 pages.
U.S. Appl. No. 09/473,075, filed Dec. 28, 1999, Rhoads (w/last amendment).
U.S. Appl. No. 09/442,441, filed Nov. 17, 1999, Rhoads (w/last amendment).
"Windows XP Can Secure Music." by Brad King in Wired News, Feb. 13, 2001 (3 pages).

*Primary Examiner*—Frantz Coby
(74) *Attorney, Agent, or Firm*—Digimarc Corporation

(57) ABSTRACT

In many situations, it is desirable to restrict access to digital content. This invention presents an extremely efficient and simple method and apparatus to degrade and recover digital content. The invented process is based upon searching the data for detection criteria and then adjusting neighboring point(s) to degrade the content, or re-adjusting the neighboring point(s) to recover the original content. For example, one could search for threshold crossings, and scale the following point by a number between 0 and 1 for degradation, or re-scale the following point by the inverse scaling value to recover the original data. The apparatus includes a logic processor and storage unit to implement the degradation and recovery process.

27 Claims, 1 Drawing Sheet

U.S. PATENT DOCUMENTS

| | | | |
|---|---|---|---|
| 5,748,763 A * | 5/1998 | Rhoads | 382/115 |
| 5,768,426 A * | 6/1998 | Rhoads | 382/232 |
| 5,778,055 A * | 7/1998 | Paneth et al. | 379/93.31 |
| 5,870,762 A * | 2/1999 | Lee | 707/202 |
| 5,875,249 A | 2/1999 | Mintzer et al. | |
| 5,912,972 A | 6/1999 | Barton | |
| 5,930,369 A | 7/1999 | Cox et al. | |
| 5,943,422 A | 8/1999 | Van Wie et al. | |
| 5,963,909 A | 10/1999 | Warren et al. | |
| 6,021,196 A | 2/2000 | Sandford, II et al. | |
| 6,021,391 A * | 2/2000 | Shyu | 705/1 |
| 6,044,182 A | 3/2000 | Daly et al. | |
| 6,049,627 A | 4/2000 | Becker et al. | |
| 6,061,793 A | 5/2000 | Tewfik et al. | |
| RE36,919 E * | 10/2000 | Park | 380/203 |
| 6,278,791 B1 | 8/2001 | Honsinger et al. | |
| 6,311,214 B1 | 10/2001 | Rhoads | |
| 6,314,433 B1 * | 11/2001 | Mills et al. | 707/202 |
| 6,359,983 B1 * | 3/2002 | Krone et al. | 379/399.01 |
| 6,366,685 B1 | 4/2002 | Takaragi | |
| 6,449,623 B1 * | 9/2002 | Bohannon et al. | 707/202 |
| 6,490,681 B1 | 12/2002 | Kobayashi et al. | |
| 6,515,755 B1 | 2/2003 | Hasegawa | |
| 6,560,349 B1 | 5/2003 | Rhoads | |
| 6,577,746 B1 | 6/2003 | Evans et al. | |
| 6,587,821 B1 | 7/2003 | Rhoads | |
| 2002/0027994 A1 | 3/2002 | Katayama et al. | |
| 2002/0037091 A1 | 3/2002 | Terasaki | |
| 2002/0040323 A1 | 4/2002 | Lee et al. | |
| 2002/0049580 A1 | 4/2002 | Kutaragi et al. | |
| 2002/0059522 A1 | 5/2002 | Hirano et al. | |
| 2002/0071556 A1 | 6/2002 | Moskowitz et al. | |
| 2002/0073319 A1 | 6/2002 | Manabe | |
| 2002/0080964 A1 | 6/2002 | Stone et al. | |
| 2002/0126762 A1 | 9/2002 | Tanaka | |
| 2002/0154778 A1 | 10/2002 | Mihcak et al. | |
| 2003/0202681 A1 | 10/2003 | Evans et al. | |
| 2004/0015362 A1 | 1/2004 | Rhoads | |

* cited by examiner

RECOVERABLE DIGITAL CONTENT DEGRADATION: METHOD AND APPARATUS

This application claims the benefit of Provisional Patent Applications Ser. No. 60/123,581 filed Mar. 10, 1999, incorporated herein by reference.

BACKGROUND OF THE INVENTION

It is desirable to degrade digital signals in many situations so as to restrict access. For instance, pay-TV broadcasts are degraded so those who haven't paid for the program cannot watch it because the picture is unclear, while those who have paid for the program see a clear picture because their recovery apparatus has been enabled. Most recently, as a result of the digital audio revolution, it is desirable to restrict MP3 (a standard bit-rate compressed audio file format) access. It is also desirable to produce inexpensive portable MP3 players, which in turn require that recovery of the original signal be simple.

There are numerous existing methods of degrading digital content, a.k.a. scrambling. Some methods require a key to de-scramble the content, whereas others do not. Most scrambling or degrading methods are based upon either adding an interference signal to the digital content, or moving the bits around. Other methods use encryption, but this is very computationally intense.

SUMMARY OF THE INVENTION

This invention degrades digital signals and recovers them using a method and corresponding apparatus that is extremely simple and efficient to implement. In addition, most configurations of the invented method and apparatus allow self-synchronization, which means the digital content can be recovered when accessed at any random part of the content. The invented process also has configurations where the original digital data can be recovered from the degraded digital data with or without the need for a key. Finally, the degradation level can be controlled such that the digital content can either be previewed in lower quality before buying, or made totally useless.

The invented degradation process involves searching through the original digital data for detection criteria and then adjusting neighboring points to degrade the content, either without affecting the location of the detection criteria or affecting it in a known fashion so that the original signal may be recovered. The detection criteria may include the relationship between several points, or be as simple as a threshold crossing or include every $M^{th}$ point. The adjustment of the neighboring points may be as simple as multiplying the point after the threshold crossing by N. It is advantageous if N is less than one but not equal to zero so saturation and data points equal to zero are not a problem, and if the threshold is positive and the data is decreasing towards zero during the threshold crossing.

The invented recovery process includes searching through the data for the detection criteria and then re-adjusting neighboring points to their original value. For example, if the adjustment in the degradation process uses multiplication by N, the recovery process multiplies by 1/N.

The corresponding apparatus includes a logical processor and memory unit. The logical processor is used to search for the detection criteria, then either adjust to degrade or re-adjust to recover the original data point(s). The memory unit is used to hold the previous point(s) necessary to find the criteria location, and the buffer, if using buffered data.

DETAILED DESCRIPTION

Below please find the definitions to terms and concepts that are used throughout this document. Digital content refers to digital data representing a perceived physical item, including but not limited to audio, video, and images. Digital data refers to the grouping of bits (1's or 0's) that represent a sample of the original digital content at an instant in time. Each bit group is equivalently referred to as a data point or sample. The data points are arranged in an order, many times representing a sequence versus time or frequency. In addition, the data points may be grouped again to form a subgroup, possibly used to represent a sequence versus frequency versus time, as is the case in MPEG standard compressed digital audio and video. Most importantly, the digital data has an order, with a beginning and end, such that searching the data is possible, and neighboring points can be defined as points close to each other. Finally, point(s) refer to one or several points.

Figure 1:
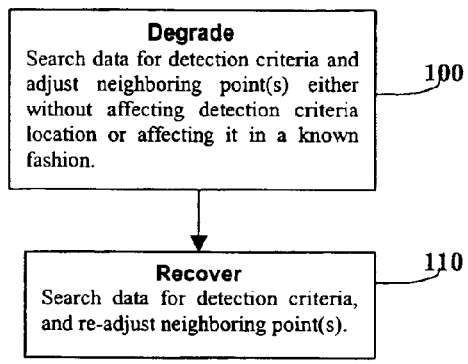
FIG. 1 is an overview of the degradation and recovery process.
Figure 2:
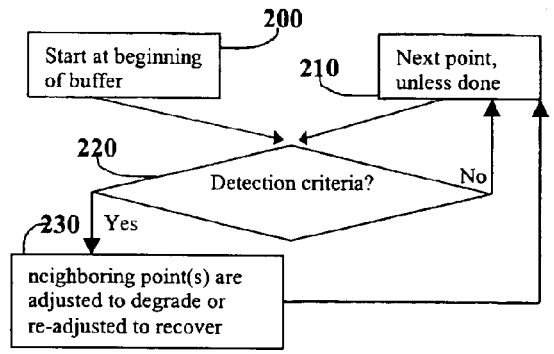
FIG. 2 is the pseudocode for the degradation and recovery process.

FIG. 1 displays an overview of the degradation and recovery process, and FIG. 2 displays the corresponding pseudocode to be implemented by the apparatus.

To degrade the digital content (box 100), the samples are searched for the detection criteria (boxes 200, 210 and 220). The searching stops after the last data point in the buffer has been examined (box 210), and a new buffer may be presented if available. As known in the state of the art, data values must be saved between buffers and properly initialized for the first buffer so as the initial points are properly searched.

When the detection criteria are found, the neighboring data point(s) are adjusted so as to cause content degradation (box 230). The adjustment of these points should not change the location of the detection criteria or change it in a known fashion; otherwise, the detection of the correct location to re-adjust the data to its original value (recovery) is not easy. In addition, it is desirable to prevent the adjustment from causing saturation or resulting in a value of zero, because then the original data point(s) will not be easily recoverable.

To recover the original digital content (box 110), the degraded data is searched for the detection criteria defined by the degradation process (box 200, 210, and 220). If the degradation process has changed the detection criteria in a known fashion, then the detection criteria in box 220 for recovery is different than that used in degradation. When the criteria location is found, the neighboring data point(s) are re-adjusted by the inverse of the method used in the degradation process (box 230).

Figure 3:
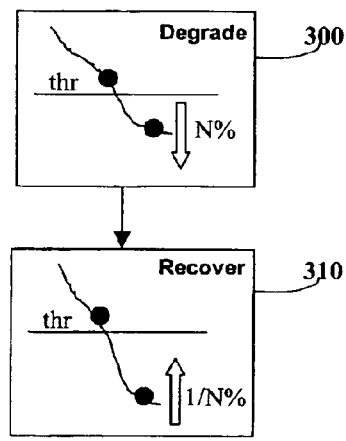
FIG. 3 is a simple and efficient example of the degradation and recovery process using a threshold crossing and adjusting only the next point.
Figure 4:
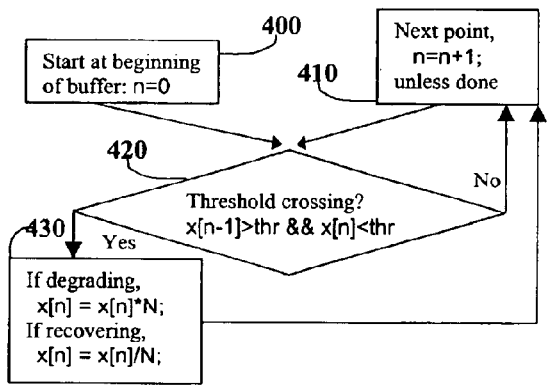
FIG. 4 is the pseudocode for the simple and efficient example of the degradation and recovery process.

An example of this process is shown in FIGS. 3 and 4. In this case (boxes 300 and 310), the detection criterion is a threshold crossing (using c-notation: x[n−1]>thr && x[n] <thr) with a positive threshold (thr>0) while the data goes towards zero (boxes 400, 410 and 420). The neighboring point(s) include only the point after the threshold crossing (box 430). To degrade the data, the adjustment involves multiplying the data point after the threshold crossing (x[n]) by N, where N is less than 1 (box 430). By reducing the value of this data point, the detection criteria location is not changed. In addition, the closer N is to 0 (but not equal to 0), the more the digital content is degraded. To recover the original digital data, the point after the threshold crossing (x[n]) is multiplied by 1/N (box 430). Care has to be taken that quantization errors do not degrade the recovered content quality. Obviously, without quantization, the recovered content will be identical to the original content.

There are additional simplistic detection criteria that can be used. For example, every $M^{th}$ data point may be degraded. In this case, synchronization for recovery may require scanning the data for M points until the correct degraded locations are found. In addition, peak values could be used, and the point after the peak could be reduced in value. As desired, this will not affect the detection criteria for the recovery process. Alternatively, threshold crossings with a negative threshold and the data moving towards zero are viable. Again, the data point after the threshold is reduced in absolute value towards but not equal to zero. For these last two cases, synchronization for recovery automatically occurs when searching the data.

Although, in this preferred configuration, the detection criteria do not change between degrading and recovering the original digital data, this is not an absolute requirement. The detection criteria may change, if in a known fashion, such that the recovery process uses a different but known detection criteria than the degradation process. In other words, box 420 (or 220, as discussed above) would be different for the degradation and recovery process.

The original content need not be represented by digital samples versus time, as one may have assumed. In many cases, such as using MPEG compression (i.e. MP3 audio), the digital samples represent subgroups of frequencies versus time. In this case the data may be searched across frequency for each subgroup, or across time for each frequency, or in any other but well-defined combination. The data may also represent either the frequency magnitude or corresponding scaling factors.

It is important to note that there are alternative ways to recover the content while removing most of the perceptual degradation caused by this degradation technique. For example, a pirate could use a low-pass filter to render reasonable content from the degraded content. The recovered digital data will not exactly match the original digital data, but its perception may be acceptable. As well know by one familiar with the state of the art in DSP, filter characteristics such as type and order will affect the recovered data.

Alternatively, one could use pseudo-random sequences (a.k.a. a key) to set the detection criteria (box 220) or the adjustment or re-adjustment of the data (box 230). This randomness increases the difficulty to illegally recover the data. For example, a pseudo-random number greater than zero but less than one could be used as the scaling value N (box 430). Or, a pseudo-random number between minimum and maximum threshold could be used for the threshold (box 420). All that matters is that the degradation and recovery process use the same pseudo-random sequence. However, this configuration requires sending a key along with the data. The key may be embedded within the data using known techniques, such that the original data is still recoverable from the degraded data.

Figure 5:
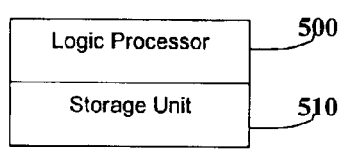
FIG. 5 is an overview of the apparatus required to implement the invented process.

FIG. 5 shows the hardware apparatus required to implement the invented degradation and recovery processes. The hardware includes a logic processor 500 and a storage unit 510. The logic processor 500 may be defined as the equivalent of a digital signal processor (DSP), general-purpose central processing unit (CPU), or a specialized CPU, including but not limited to media processors. A likely DSP chip is one of the Texas Instruments TMS320 product line. A CPU could include one of Intel's Pentium line or Motorola/IBM's PowerPC product line. The design of code for controlling logic processor 500 is simple for someone familiar with the state of the art given the above pseudo-code and description. The storage unit 510 includes RAM when-using a digital processor, and is required to store the current buffer and/or previous point(s) for the detection criteria.

In addition, a person familiar with the state of the art could implement the logic processor 500 with analog and digital circuitry, either separately or in an application specific integrated circuit (ASIC). The analog and digital circuitry could include any combination of the following devices: digital-to-analog converters (D/A), comparators, sample-and-hold circuits, delay elements, analog-to-digital converters (A/D), and programmable logic controllers (PLC).

In summary, the main advantage of this invention is that it is an extremely simple and efficient method and apparatus to protect content as compared to prior-art scrambling and encryption methods.

The foregoing descriptions of the preferred embodiments of the invention have been presented to teach those skilled in the art how to best utilize the invention. Many modifications and variations are possible in light of the above teaching. For example, as discussed, there are many detection criteria and adjustment schemes that are similar to those described. To this end, the following claims define the scope and spirit of the invention.

I claim:

1. A process to intentionally degrade original digital data comprising:
   searching the original digital data for detection criteria; and
   after locating detection criteria, adjusting at least one neighboring point associated with the detection criteria, wherein the original digital data is degraded in quality by said adjusting, but the original digital data is recoverable from the intentionally degraded digital data.

2. The process of claim 1 in which the detection criteria comprises a pseudo-random sequence.

3. The process of claim 1 in which the adjustment of the at least one neighboring point involves a pseudo-random sequence.

4. The process in claim 1 in which the detection criteria includes a threshold crossing.

5. An apparatus comprising:
   a logic processor; and
   a storage unit comprising means for analyzing digital content, wherein the digital content has been transformed with a self-synchronizing degradation from an original state of the digital content, and means for recovering the original state of the digital content from the self-synchronized degraded digital content.

6. A method of restoring degraded digital content, wherein the degraded digital content comprises degradation from an original state of the digital content, said method comprising:
   analyzing the degraded digital content to identify a plurality of detection criteria, wherein for each of the plurality of detection criteria there exists in the degraded digital content a group of neighboring points; and for each group of neighboring points, adjusting each member of a group of neighboring points according to a predetermined process, wherein the predetermined process corresponds with a process used to degrade the digital content from the original state, and wherein said adjusting helps to restore the degraded digital content to the original state.

7. The method of claim 6, wherein the group comprises at least one neighboring point.

8. The method of claim 6, wherein the plurality of detection criteria comprises a pseudo-random sequence.

9. The method of claim 6, wherein the plurality of detection criteria includes a threshold crossing.

10. The method of claim 6, wherein the predetermined process is an inverse of the process used to degrade the digital content from the original state.

11. The method of claim 6, wherein the digital content comprises audio content.

12. The method of claim 6, wherein the digital content comprises video content.

13. The method of claim 6, wherein the digital content comprises image content.

14. The method of claim 6, wherein the degraded digital content is intentionally degraded in a manner which does not convey information.

15. A method of restoring intentionally degraded digital content, wherein the intentionally degraded digital content comprises intentional degradation from an original state of the digital content, said method comprising:
analyzing the intentionally degraded digital content to identify a plurality of detection criteria; and
for each of the plurality of detection criteria, adjusting the intentionally degraded digital content according to a predetermined process, wherein the predetermined process corresponds with a process used to intentionally degrade the digital content from the original state, and wherein said adjusting restores the intentionally degraded digital content to the original state.

16. The method of claim 15, wherein for each of the plurality of detection criteria there exists in the degraded digital content a group of neighboring points, wherein said adjusting comprises for each group adjusting each member of the group of neighboring points.

17. The method of claim 15, wherein the digital content comprises audio.

18. The method of claim 15, wherein the digital content comprises video.

19. The method of claim 5, wherein said means for recovering the original state of the digital content comprises means for analyzing the degraded digital content to identify a plurality of detection criteria, and means for adjusting for each of the detection criteria the degraded digital content according to a predetermined process.

20. The method of claim 19, wherein the predetermined process corresponds with a process used to degrade the digital content from the original state.

21. The method of claim 20, and wherein said adjusting means helps to restore the degraded digital content to the original state.

22. The method of claim 19, wherein for each of the plurality of detection criteria there exists in the degraded digital content a group of neighboring points, wherein said adjusting means adjusts, for each group, each member of the group of neighboring points.

23. The method of claim 5 wherein the self-synchronizing degradation comprises intentional degradation.

24. An audio player for playing back an audio signal distributed through a network, which comprises:
removing means for removing degradation data from an audio signal embedded with data using a specific key, said degradation data being at a signal level which is audible to the human sense of hearing; and
playback means for playing back an audio signal.

25. The player of claim 24 wherein the degradation data includes embedded data.

26. An audio distribution system including a distribution apparatus for distributing an audio signal through a network and an audio player for playing back said distributed audio signal, wherein said distribution apparatus comprises embedding means for embedding in said audio signal degradation data of which a signal level is audible to the human sense of hearing when the audio signal is played back; and wherein said audio player comprises removing means for removing degradation data from said embedded audio signal using a specific key.

27. An audio distribution method wherein a sending side processes an audio signal for distribution through a network and a receiving side plays back the audio signal, said method comprises: embedding degradation data in an audio signal at the sending side, the degradation data having a signal level that is audible to the human sense of hearing when the audio signal is played back; and removing degradation data from the embedded audio signal using a specific key at playback.

* * * * *